patented Oct. 23, 1951

2,572,568

UNITED STATES PATENT OFFICE 2,572,568

POROUS COMPOSITION MADE WITH SUBSTITUTED CARBAMYL AMINO ACID AS BLOWING AGENT

Earl W. Gluesenkamp, Centerville, Ohio, assignor to Monsanto Chemical Company, St. Louis, Mo., a corporation of Delaware No Drawing. Application August 20, 1949,
Serial No. 111,561

6 Claims. (Cl. 260—2.5)

This invention relates to new porous, resinous compositions having unusual properties as hereinafter described. More particularly the invention relates to compositions containing uniformly dispersed therein small gas filled cells.

Artificial sponge-like compositions, made from natural gums and resins and from synthetic resins and rubbers, are well known to the art. They are usually made from thermoplastic polymeric compounds by compounding the polymers with substances which evolve gases when heated, and then heating the blended compositions to form numerous minute gas cells. Compositions so obtained have unusually low density and a porous cellular structure. It is also conventional to incorporate anti-oxidants, accelerators and vulcanizing agents into synthetic or natural rubber and obtain by heating a fully cured porous composition.

One purpose of this invention is to provide new improved porous plastic compositions. A further purpose is to provide new and more effective agents for generating the gas within the plastic body. A still further purpose of this invention is to provide a means of incorporating, reinforcing linear polymers within the structure of the porous body simultaneously with the production of the gas cells. Other purposes will be evident in the following description of the invention.

In copending application Serial No. 51,109, filed September 24, 1948, by Earl W. Gluesenkamp, there is described and claimed a method of achieving the desired result by the use of N-carboxyaminoacid anhydrides. This method is quite effective in the preparation of high quality porous compositions from thermoplastic resinous compounds due to the formation of a linear, protein-type polyamide intimately dispersed in a matrix of the base resin, which is reinforced and otherwise modified by the presence of the linear polymer. The method of the copending application is difficult to practice because of the instability of the N-carboxyaminoacid anhydrides which spontaneously decompose in the presence of moisture. Accordingly, under many circumstances a portion of the effectiveness of the blowing agent is lost.

In accordance with the present invention it has been discovered that an identical result may be achieved by using as the gas generating agents compounds of the following structure:

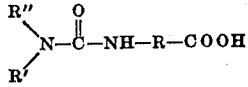

wherein R is a divalent aliphatic or araliphatic hydrocarbon radical having up to ten carbon atoms of an amino acid, R' and R" may be any alkyl, aralkyl, aryl, alkaryl, or R' and R" together may be any saturated divalent hydrocarbon radical. The compositions are prepared by reacting any secondary amine with phosgene in the presence of pyridine or other agent for removing the evolved hydrogen chloride. The resulting substituted carbamyl chlorides are then reacted with the desired gas generating agents. The latter reaction is conducted in any suitable solvent medium, for example acetone or other water miscible solvent. After refluxing the mixture the acetone or other volatile solvent is evaporated and the reaction mixture filtered. The product is then acidified, for example with hydrochloric acid and extracted with ether. The substituted amino acids are then separated by evaporation of the ether.

Useful amino acids for practicing the invention are leucine, glycine, alanine, phenylalanine, lysine, valine, isoleucine, norleucine, sarcosine, isovaline, tyrosine, or mixtures of any two or more amino acids. Although the derivatives of any amino acid may be used, those derived from the beta- and gamma- amino acids, and particularly the alpha-amino acids are preferred. The acids may be used in the crude by-product form with substantial proportions of inert impurity.

Suitable secondary amines for the practice of this invention are those having two hydrocarbon substituents having up to ten carbon atoms. The hydrocarbon radicals may be the same or different, and may be any of the following: methyl, ethyl, n-propyl, isopropyl, n-butyl, isobutyl, tertiary isobutyl, amyl, hexyl, cyclohexyl, 2-ethylhexyl, nonyl, decyl, phenyl, naphthyl, cresyl, ethylphenyl, dimethylphenyl, benzyl, phenethyl, methylbenzyl, and any homologues thereof having up to ten carbon atoms. The secondary amines may be cyclic, such as morpholine or piperidine, in which case the R' and R" groups represent a single divalent radical.

Suitable derivatives for the practice of this invention are:

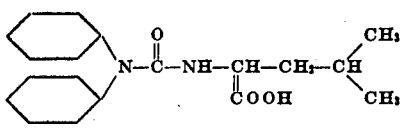

N-(N',N'-diphenylcarbamyl) leucine

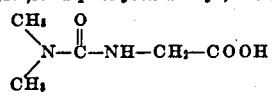

N-(N',N'-dimethylcarbamyl) glycine

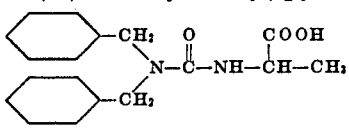

N-(N',N'-dibenzylcarbamyl) alanine

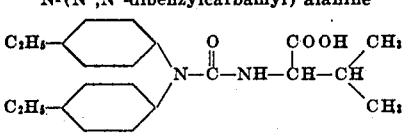

N-(N',N'-di-p-ethylphenylcarbamyl) valine

The described amino acid derivative will decompose upon heating in accordance with the following equation:

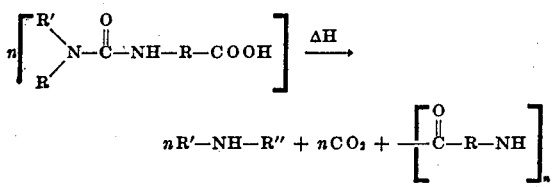

The reaction proceeds with the formation of high molecular weight linear polymers, which reaction continues until it is complete. Each molecule of the amino acid derivative evolves a molecult of carbon dioxide. Because the reaction proceeds slowly and uniformly minute and well dispersed gas cells are formed when the compounds are used as blowing agents.

The amino acid derivatives may be used to generate gas cells in a wide variety of natural and synthetic plastics. Rubber derived from *Hevea brasiliensis*, guayule, or other natural source may be used, and also synthetic rubber, including the polymers and copolymers of diolefins, such as isoprene, butadiene and chloroprene, particularly the copolymers of butadiene and isoprene with other polymerizable monomers, for example, styrene, acrylonitrile, acrylic and methacrylic esters, and vinyl chloride. The more useful synthetic rubbers are the copolymers of 40 to 90 percent of the diene, particularly butadiene, and from 10 to 60 percent of the other polymerizable monomer, particularly styrene and acrylonitrile. Other useful synthetic rubbers are copolymers of one to ten percent of the diene, for example butadiene, isoprene and 90 to 99 percent of an isoolefin, particularly isobutylene.

In processing rubber, it is generally desirable to incorporate vulcanizing agents and the blowing agents, and thereby effecting a cure by continuing the heating after the blowing is completed. Conventional vulcanizing agents, such as sulfur, and accelerators, for example magnesia, diphenyl guanidine, hexamethylenetetramine and mercaptobenzothiazole, and anti-oxidants, such as diaminodiphenylamine, may be used.

Another class of compositions which may be processed in accordance with this invention are the polymers and copolymers of vinyl chloride. This class of compositions includes polyvinyl chloride and copolymers of upward of 70 percent of vinyl chloride, and up to 30 percent of other polymerizable monomers, for example vinyl acetate and other vinyl esters of monocarboxylic acids, methyl methacrylate and other alkyl esters of methacrylic acid, methyl acrylate and other alkyl esters of acrylic acid, methyl maleate and other alkyl esters of maleic acid, methyl fumarate and other alkyl esters of fumaric acid, and vinylidine chloride.

In processing the polymers and copolymers of vinyl chloride, it is frequently desirable for the final composition to contain from five to 50 percent by weight of a suitable plasticizer to render the composition sufficiently fluid at blowing temperatures. Generally, these are more thermoplastic than cured rubber, and, unless heavily plasticized, less resilient.

The new compositions are prepared by milling the plastic resin or rubber with from two to thirty percent of the N,N-disubstituted carbamyl derivative of the amino acid on a mill at a temperature not greater than the minimum decomposition temperature of the amino acid derivative, then confining the sample in a suitable mold, and finally heating the mold and its contents to a temperature at which the carbon dioxide is evolved, for example 125 to 200° C. Under such conditions the evolved carbon dioxide is dispersed in small gas bubbles and the linear polyamide is formed in the resinous composition in which it is intimately dispersed. The tenacity of the porous composition may be changed by varying the proportion of the blowing agent, preferred compositions being prepared by the use of three to twenty percent.

Further details of the invention are set forth with respect to the following specific examples.

*Example 1*

A typical rubber stock conventionally used in preparation of rubber sponges was the following.

| Composition: | Parts by weight |
|---|---|
| Smoked sheets | 100 |
| Zinc oxide | 5 |
| Sulfur | 3 |
| Whiting | 30 |
| Stearic acid | 3 |
| Mineral rubber | 10 |
| Paraffin | 2 |
| Cycline oil | 23 |
| Flectol H (condensation product of aniline and acetone) | 1.0 |
| El-Sixty (Di-(2-benzothiazylthiomethyl) urea) | 0.9 |

A series of samples of the rubber were milled with five, ten and fifteen parts by weight, respectively, of N,N-diphenylcarbamyl derivative of a mixture of amino acids comprised of essentially a mixture of equal parts of leucine and isoleucine.

The samples were milled cold, inserted into a cylindrical mold 0.75 inch in diameter and one inch in height. The mold was heated to 153° C. which temperature was maintained for twenty minutes. Soft rubber with a cellular structure was thereby formed.

*Example 2*

The procedure of the preceding example was repeated except that 8.5 percent of oleic acid, based on the smoked sheet, was added. The resulting molded compositions had a uniform porous structure but were somewhat stiffer than the products of the preceding example.

The invention is defined by the following claims.

I claim:

1. A method of preparing a porous composition from a thermoplastic resin, which comprises dispersing in the resin from one to 30 percent of a compound having the structural formula:

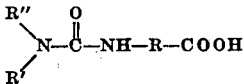

wherein R is a divalent hydrocarbon radical of the group consisting of aliphatic radicals and araliphatic radicals having up to ten carbon atoms, and R' and R'' are radicals of the group consisting of aryl, alkyl, aralkyl, alkaryl and cycloalkyl radicals having up to ten carbon atoms, and heating the composition to induce the polymerization of the amino acid derivative, and the formation of gas cells in the composition.

2. A method of preparing porous vulcanized rubber compositions, which comprises intimately dispersing in an uncured rubber a vulcanizing agent and from one to 30 percent of a compound having the structural formula:

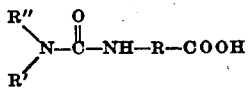

wherein R is a divalent hydrocarbon radical of the group consisting of aliphatic radicals and araliphatic radicals having up to ten carbon atoms, and R' and R'' are radicals of the group consisting of aryl, alkyl, aralkyl, alkaryl and cycloalkyl radicals having up to ten carbon atoms, and heating the composition to polymerize the amino acid derivative, to form gas cells in the composition, and to cure the composition.

3. A method of preparing porous compositions, which comprises intimately dispersing in a thermoplastic vinyl chloride polymer from one to thirty percent by weight of a compound having the structural formula:

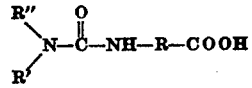

wherein R is a divalent hydrocarbon radical of the group consisting of aliphatic radicals and araliphatic radicals having up to ten carbon atoms, and R' and R'' are radicals of the group consisting of aryl, alkyl, aralkyl, alkaryl and cycloalkyl radicals having up to ten carbon atoms, heating the composition to polymerize the amino acid derivative, and to form gas cells in the amino acid derivative.

4. A method of preparing a porous composition, which comprises intimately dispersing in a composition of the class consisting of vinyl chloride polymers and rubbers, from one to thirty percent of a compound having the structural formula:

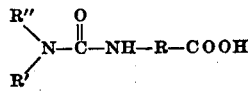

wherein R is a divalent hydrocarbon radical of the group consisting of aliphatic radicals and araliphatic radicals having up to ten carbon atoms, and R' and R'' are radicals of the group consisting of aryl, alkyl, aralkyl, alkaryl and cycloalkyl radicals having up to ten carbon atoms, and heating the mixture to polymerize the amino acid derivative and to form gas cells in the composition.

5. A method of preparing a porous composition, which comprises intimately dispersing in a rubber, from three to twenty percent of N,N-diphenylcarbamyl derivatives of a mixture of amino acids, and heating the composition to polymerize the amino acid derivatives and form gas cells in the composition, the said derivatives being those of amino acids having the carboxy and amino radicals attached to a hydrocarbon radical having up to ten carbon atoms.

6. A method of preparing a porous composition, which comprises intimately dispersing in a vinyl chloride polymer, from three to twenty percent of N,N-diphenylcarbamyl derivatives of a mixture of amino acids, and heating the composition to polymerize the amino acid derivatives and form gas cells in the composition, the said derivatives being those of amino acids having the carboxy and amino radicals attached to a hydrocarbon radical having up to ten carbon atoms.

EARL W. GLUESENKAMP.

REFERENCES CITED

The following references are of record in the file of this patent:

Von Meyer: Journal für Praktische Chemie (2) 82, pages 526–529 (1910).